March 19, 1973   G. W. REINBOLD ET AL   3,798,340
MANUFACTURE OF SALTED CHEESE
Filed Jan. 3 1972

United States Patent Office 3,798,340
Patented Mar. 19, 1974

3,798,340
MANUFACTURE OF SALTED CHEESE
George W. Reinbold and Earl G. Hammond, Ames, Iowa, assignors to Iowa State University Research Foundation, Inc., Ames, Iowa
Filed Jan. 3, 1972, Ser. No. 214,739
Int. Cl. A23c 19/02
U.S. Cl. 426—361                                   15 Claims

ABSTRACT OF THE DISCLOSURE

Rindless Swiss cheese, or other brine-salted or dry-salted cheese, is manufactured by an improved process in which porous absorbent coverings, such as sponge pads, are applied to outer absorptive surfaces of the formed curd bodies. An aqueous salt brine of a concentration promoting osmotic diffusion is provided within the porous coverings and impermeable close-fitting coverings are applied around the cheese bodies and porous coverings. The cheese bodies are then held while the salt is transferred from the porous coverings into the cheese bodies, the holding being continued until curing is complete, and/or the cheese bodies contain the desired amount of salt. The process is particularly advantageous for producing rindless, salted, cured cheese without significant loss of moisture.

BACKGROUND

Rindless Swiss cheese has been produced in the United States for about twenty-five years. The process for producing this kind of cheese was developed by the Kraft Foods Division of National Dairy Products Corporation (now Kraftco), as disclosed in its Pat. 2,494,636, which was filed in 1946 and issued in 1950. At the present time, Swiss cheese is one of the major kinds of cheese produced in the United States, and it is believed that most Swiss cheese is manufactured by the "rindless" process.

While details of the procedure may vary, the main steps of the commercial process for manufacturing rindless block Swiss cheese are well established. The initial steps of the process do not vary significantly from the older and still used process of making wheel Swiss cheese with a heavy rind. Following rennetting, cutting of the curd, and foreworking, the curd is cooked and drained, including the steps of "stirring-out" and "dipping." The cooked, drained curd is then ready to be pressed into blocks, preparatory to salting and curing.

The standard and only accepted salting procedure for rindless block Swiss cheese is the same as that for rinded wheel cheese; namely, the pressed blocks or wheels are introduced into a brine tank containing a substatially saturated solution of aqueous sodium chloride. The soaking in the brine tanks is continued from 1 to 3 days until the blocks or wheels have absorbed the desired amount of salt (typically about 0.7 to 1.5% salt). The brine is refrigerated either directly, or by having the room cooled. To maintain the salt concentration of the brine in the brine tanks at near saturation, and to expose additional surfaces of the cheese bodies to salt, dry salt may be applied to the exposed top surfaces of the floating cheese bodies, or salt brine can be sprayed over the tops of the cheese bodies. The volume of brine to which the cheese bodies are exposed is relatively large, being many times the moisture content of the chese bodies. Further, the external brine remains at or near saturation during the entire soaking period. Until the present invention, it was believed that the disadvantages of these features of the brine soaking procedure have not been fully appreciated.

In manufacturing rindless block Swiss cheese, the brine soaking results in the formation of a partial rind, but this disappears after the application of the impermeable wrapper, during the early stages of curing. The application of an impermeable covering, in the form of a wrapper or coating, is the essential characteristic feature of manufacturing of rindless Swiss cheese. This procedure can also be used, however, for making rindless cheese of other kinds, particularly varieties of Italian cheese. As is well known in the art the covering should have sufficiently low permeability to water vapor and air so as to protect the surfaces of the cheese bodies, preventing the formation of rind, and preventing the entrace of air and further drying of the surfaces during curing and holding periods. The covering is sufficiently impermeable to prevent mold and other undesirable surface growth, and is formed of a material which does not impart any objectionable flavors, odors, or colors to the cheese. The impermeable coverings are applied so that they envelop the cheese, conforming closely to the shape of the individual cheese bodies, thereby adequately protecting the surfaces.

Following the application of the impermeable wrapper or coating, the cheese bodies are subjected to holding and curing, which usually involves several different stages in terms of holding temperautres. A cold room or precooler is usually the first stage, where the cheese is held for up to ten days at temperautres of about 45–55° F. In some Swiss cheese plants, however, this precooling stage is omitted, and the wrapped cheese bodies are introduced directly into the so-called "warm rom." The temperatures in the "warm" room range from about 70 to 78° F., the temperature of the cheese body thereby being increased to this temperature. The length of holding in the warm room is usually from 2 to 4 weeks, but occasionally longer holding times are used. In one simplified procedure, the wrapped cheese is held for ten days in the precooler, three weeks in the warm room, and then stored for several months in a finish cooler. In the finish coolers, the initial temperatures of the cheese body may range from 70 to 78° F., but the temperature is rapidly reduced to a storage temperature in the range of 36–55° F. Cheese may be held in the finish cooler for one to five months, or until ready for shipment and sale, which can occur at any time after cheese is 60 days old.

In the manufacture of rindless block Swiss cheese, all of the holding stages following wrapping may be regarded as part of the "curing" of the cheese, for which the cheese has been prepared by the prior steps. In the precooler, the cheese is prepared for eye formation by improved knit and elasticity of the curd. The lactic cultures, if used, are usually dying at this stage, while the low-temperature lactobacilli begin to grow. In the warm room, the typical Swiss cheese eyes and flavor develop with enhancement of body characteristic. The growth of the propionibacteria is rapid, and other casual bacteria flourish. In the finish cooler, full flavor and mellow body develop. The growth of the propionibacteria is arrested, but other bacteria may continue to grow slowly.

THE PROBLEM

In connection with the manufacture of rindless Swiss cheese, it has been previously suggested that the brine soaking procedure be eliminated (see Feutz et al. U.S. Pat. 2,864,704, issued in 1958 to The Borden Company). The specification of the Feutz patent points out that some moisture is extracted from the outer surfaces of the cheese block during brining, resulting in the formation of outer skins or partial rinds which are relatively dehydrated compared to the interior of the cheese bodies. It is proposed to overcome this result by mixing the required amount of salt with the curd while the curd still remains mixed with part of the whey in the vat. As far as we are aware, such a procedure has never been used commercially. The addition of substantial salt to the curd in the vat, particularly solid salt particles, will result in a final cheese product of poor texture, containing soft spots where the salt has inhibited the growth of bacteria. It is well recognized that many of the bacteria contributing to the curing of Swiss cheese are salt-sensitive. A further disadvantage is that the portion of the whey left in the vat to permit the mixing of the curds with the salt will become contaminated with the salt, thereby interfering with the use of the whey as an animal or human food, and contributing to the disposal problems of the cheese plant.

Fortunately, the dehydrated surface or partial rind referred to by Feutz et al. as being produced by brine soaking is not permanent. In the brineless process, after the cheese bodies are wrapped, moisture redistribution occurs, the cheese surfaces become rehydrated, and any skin or rind is substantially eliminated. In view of the recognized objections to vat salting, and the fact that curing the cheese in impermeable wrappers restores the cheese to a "rindless" condition, Swiss cheese manufacturers have continued to use the brine soaking as an essential part of the procedure for manufacturing rindless referred to by Feutz et al. as being produced by brine soaking step have been recognized, and the cheese art has attempted to find other solutions.

Where the duration of the brine soak is limited, or where the blocks of Swiss cheese are of especially large size, the final cheese product, or at least the central portions thereof, may be deficient in salt. In Hermann U.S. Pat. 3,046,140, issued in 1962 to National Dairy Products Corporation, it is proposed to slice the cured Swiss cheese and package the cheese slices in contact with an aqueous salt solution. During commercial distribution of the cheese slices, additional salt can be absorbed. It is not known whether this process has ever been practiced commercially in the United States, but it is believed that its use has been very limited commercially, if at all.

In reexamining the problems associated with the salting of rindless Swiss cheese, and other cheese, by soaking the pressed cheese bodies in tanks of saturated brine, the inventors of this application have been particularly concerned about moisture loss. Depending on the size of the cheese blocks, moisture variations in the curd, the length of the brine soak, and other procedural variations, such as whether dry salt is applied to the tops of the floating blocks, or a brine spray is applied, the amount of water lost by the cheese in the brine tanks can vary considerably. It appears that the moisture loss may range from 2 to 5% by weight of the cheese bodies. Further, the exact moisture loss is difficult to control or predict. The present inventors have therefore sought a new salting procedure, applicable to rindless Swiss cheese and other cheese, which eliminates labor costs and other problems associated with the use of brine soaking tanks, which provides improved control of salt introduction and moisture loss, and which is capable of producing cheese of as good or better quality than the prior art cheese. In particular, a specific objective has been to provide a method of salting bodies of pressed cheese curd without any significant moisture loss. The desired process would therefore result in more salable cheese of controlled moisture content up to the legal limit, which for rindless block Swiss cheese is 41% water by weight.

SUMMARY

In the established prior art processing of rindless Swiss cheese, the blocks of cheese after removal from the brine tanks are carefully dried. The exterior surfaces of the cheese bodies are dried to remove surface moisture. The exterior surfaces of the cheese bodies are therefore substantially dry when the impermeable coverings are applied and they remain substantially dry during curing in the precooler, warm room and finish cooler. If water or salt brine is left on the surface of the cheese bodies when they are wrapped, this can result in discoloration or mottling of the surfaces. If the cheese blocks are wrapped while still wet from the brine tank, an objectionable spotted or bleached surface condition may result.

Proceeding contrary to the recognized teaching of the cheese art, the process of the present invention provides a means for maintaining a predetermined amount of salt brine in contact with the exterior surfaces of the cheese blocks during curing. This is accomplished by applying porous absorbent coverings, such as thin sheets of sponge material, to at least part of the outer absorptive surfaces of the cheese bodies. The porous coverings are selected so that they are capable of holding and diffusing a salt brine in osmotic transfer relation with the cheese body surfaces. By one of several techniques to be described below, these porous coverings are provided with an aqueous salt brine of a concentration promoting osmotic diffusion of the salt, and the total amount of salt thus provided corresponds generally (equal or slight excess) to the desired salt content of the cheese bodies. As in the standard rindless Swiss cheese process, impermeable close-fitting coverings are applied to the cheese bodies, but the essential difference is that the impermeable coverings also enclose the porous coverings. These cheese bodies are then held and cured with the impermeable and porous coverings thereon while the salt is transferred from the porous coverings into the cheese bodies. It has been found that the required holding period for adequate salt transfer corresponds well with the usual holding and curing periods for rindless Swiss cheese. Within the usual curing times, the applied salt diffuses into and distributes through the cheese bodies. Distribution of the salt for a desired salt content appears to be as good or better as that achieved with the brine soak procedure. At the same time, moisture loss can be substantially avoided. It appears that any moisture extracted into the porous pads is relatively limited, and, further, moisture is absorbed into the cheese from the porous pads as the salt concentration in the pads decreases. The quality of the cheese is not adversely affected, being in general as good as with the use of brine soak tanks. Further, the porous coverings can be removed at the conclusion of the curing to provide outer surfaces of acceptable appearance and condition.

THE DRAWING

Although the method of the present invention can be understood without reference to any drawing, it is believed that the attached drawing will be of value in visualizing certain features of the process.

Figure 1:
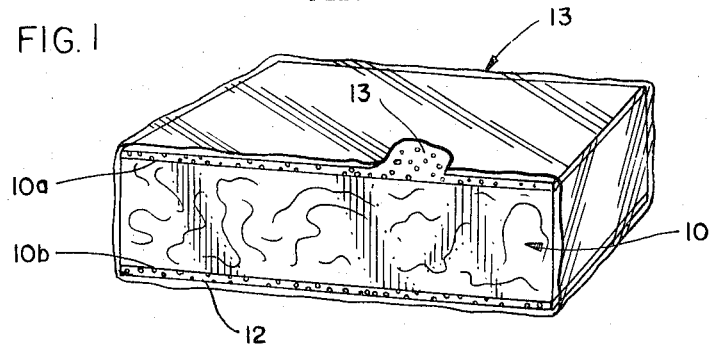
FIG. 1 is a perspective view of a cheese block prepared for simultaneous salting and curing in accordance with the present invention, part of the transparent impermeable outer wrapper being broken away to show the brine-containing sponge pads in contact with the top and bottom surfaces of the cheese body.

From the following detailed specification, it will be apparent that the method of this invention is not limited to the specific embodiments shown in FIGS. 1 to 5 of the drawings.

DETAILED DESCRIPTION

While the method of the present invention is particularly applicable to the manufacture of rindless block Swiss cheese, it is believed applicable to the manufacture of other brine-salted or dry-salted cheeses. Further, although it is preferred that the cheese bodies are pressed or otherwise formed into blocks of rectilinear shape, such as six-sided blocks with the top and bottom surfaces having greater surface areas than any of the other opposite sides, the salting method of this invention can be practiced with cheese bodies of other shapes, such as cheese bodies pressed into wheels, or even spherical or bodies of other rounded shapes.

In the commercial manufacture of rindless Swiss cheese, the cooked drained curd is formed into elongated six-sided blocks. Generally, the thickness of the block is several times less than their length, which is the longest dimension. Such blocks are ideally suited for practicing the present invention. Further, the method is applicable to the large commercial sizes of such blocks (viz. 80 to 200 lb. blocks).

In addition to the manufacture of Swiss cheese, the salting method of this invention can be used in preparing other salted cheeses, such various Italian cheeses, including Provolone and Mozzarella. The fact that certain of these cheeses are aged more than others does not prevent use of the salting method, providing the cheese bodies can be held after application of the porous and impermeable coverings for periods of from 5 to 30 days. The resulting cheese product will be a salted cheese of the rindless type. Although certain cheeses, such as Italian cheeses, are typically produced with heavy rinds, if a rindless cheese of the same character is desired, it can be produced by a procedure analogous to the production of rindless Swiss cheese, and while obtaining the further advantages of the salting method of this invention.

As used in this application, the term "Swiss cheese" is intended to be generic. It refers not only to Emmentaler cheese, but also to other Swiss-type cheeses, such as Samsoe, which are cured with propionibacteria to form eyes, and which are adaptable to "rindless" production processes.

In practicing the present invention with Swiss cheese blocks, the curd blocks will usually have an initial moisture content of 36 to 39% by weight. Occasionally, cheese curd of as low moisture content as 35% may be encountered, or relatively high moisture curd in the range of 39 to 41% by weight moisture. For the purposes of the present invention, the starting moisture is not critical, and, in fact, the method provides a means of simultaneously adding salt to the cheese and controlling moisture, maintaining a desired moisture content, or even increasing the internal moisture of the cheese. In rare cases, where the cheese curd was at or above the legal limit of 41% moisture for Swiss cheese, the method can be modified to avoid any increase in moisture content or even to slightly reduce moisture.

In accordance with the present invention, porous absorbent coverings are applied to at least part of the outer absorptive surfaces of the freshly-pressed cheese bodies. A wide variety of porous coverings can be utilized, providing certain general characteristics are provided. The porous coverings should be capable of holding and diffusing a salt brine in osmotic transfer relation with the cheese body surfaces. Further, the porous covering must be food acceptable, and should not impart any objectionable flavor, odor, or color to the cheese. It is also preferred that the porous coverings have sufficient coherence so that they can be readily removed from the cured cheese, such as by stripping the coverings off of the outer surface of the cheese. By selecting the porous coverings so that they can be removed or stripped off while leaving the outer surfaces clean and free from the material of the coverings, the outer surfaces of the cheese will not require any special processing, and will be fully utilizable as part of the commercial products. However, if some material from the porous coverings remains on the outer surface of the cheese, and this can be removed, the coverings may be commercially practical. In particular, reusable porous coverings are expected to be advantageous, since this will permit use of the coverings with more than one batch of cheese. For example, the coverings can be removed, washed, and then reused.

With reference to specific materials, thin cellulose sponge pads have been found to be particularly suitable. Cellulose sponge material is obtainable in sheet form. Thicknesses of ¼ to ½ inch are suitable. Sponge pads formed of food-acceptable plastics or elastomeric materials can also be used, and the sponge material need not be flexible or compressible, although this is convenient for handling and applying the pads. The porous coverings may also be formed of fibrous sheet material such as a heavy cloth or blanket woven from natural or synthetic fibers. Filter cloths of the kind used in plate-and-frame filter presses for filtering edible products are suitable. Other usable fibrous materials, include absorbent paper, such as filter paper, blotting paper, and the like. For removability and reuse, it is expected that woven sheet material will be more practical. Very thin sheet materials can be combined into several layers to provide the total thickness of the absorbent covering. Usually, it will not be necessary or desirable to employ coverings thicker than ½ inch. The porous absorbent covering can also be applied as a coating. For example, the salt brine can be mixed with a gelling agent, such as a macrocolloid. The coatings may be applied hot, and formulated so that they will solidify on cooling, or other gellation principles can be utilized, such as causing the macrocolloid to undergo coacervation to form a solid coating. Such coatings can contain the salt in a micelle structure, providing the brine is not so sealed within the coating that it cannot transfer by osmotic diffusion into the cheese body.

In practicing the present invention, the desired amount of salt for incorporation in the cheese bodies is predetermined. Conveniently, the desired salt level is established in terms of weight percent. For example, for Swiss cheese, the usual salt content ranges from about 0.7 to 1.5% salt by weight, while a more inclusive range is from 0.5 to 2.0% salt. With other types of cheese, it may be desirable to incorporate more or less than these amounts of salt. Usually, it will not be desirable to incorporate less than 0.3% or more than 3.5% salt by weight. To accomplish such amounts of salt incorporation, it will usually be desirable to provide somewhat more salt in the porous coverings. For example, from 0.4 to 4.0% by weight of salt can be provided in the porous coverings for obtaining final cheese salt levels of 0.2 to 3.5%. Correspondingly, the salt provided in the pads can range from 0.5 to 3.5% for achieving cheese salt levels of 0.3 to 3.0%. It will be appreciated, however, that the distribution of salt within the cheese bodies in normal holding times will not be completely uniform.

In the preferred embodiments to this method where block Swiss cheese is being salted, the porous coverings can be provided with amounts of salt corresponding to 0.5 to 2.0% of the initial weight of the cheese bodies for obtaining final salt levels in the cheese of 0.3 to 1.5% by weight.

Various techniques can be used to apply the salt to the porous coverings. One preferred procedure is to form a concentrated salt brine, and wet the porous coverings with an amount of the brine containing the total amount of salt desired to be incorporated in the cheese.

To accomplish osmotic transfer, the initial brine concentration in the porous coverings should be substantially higher than the desired salt concentration in the cheese bodies with reference to the total water therein. Usually, a concenration in the external brine of at least 5% by weight will be required. Preferably, the brine should range from half saturation to full saturation. At the usual temperatures of the precooler (45–55° F.), half saturation is about 12 to 13% salt, while full saturation is about 25 to 26% salt.

Salt brine concentrations in the porous coverings of at least 12% are preferred. It is believed that optimum results are obtained when the salt concentration is initially 20% or greater.

While it has been found to be possible to provide the salt to the absorbent pads in dry form, providing the dry salt is kept away from the outer surface of the cheese until a brine solution has formed, this procedure has the disadvantage that water must be initially extracted from the cheese in order to form the brine solutions within the pads. Consequently, if the porous coverings are pre-impregnated with dry salt, or if dry salt is applied to the outer surfaces of the porous coverings, it is preferred to add external water to the porous coverings before application of the impermeable coverings. In particular, as previously indicated, the added water can be incorporated in the pads as part of an aqueous salt brine, and this is desirable, even if additional salt is provided as dry salt on the outer surfaces of the porous coverings. In one preferred embodiment, the aqueous salt brine applied to the porous coverings contains substantially all of the salt to the transferred to the cheese bodies.

The various possible techniques for supplying salt to the porous coverings can be summarized as follows:

(1) wetting the porous coverings with an aqueous salt brine, the salt brine preferably containing all of the salt to be transferred to the cheese bodies;
(2) applying dry salt to the outer sides of the porous coverings, the coverings remaining dry until the cheese bodies are wrapped with the impermeable coverings, whereupon water is extracted from the cheese bodies into the porous coverings to provide the brine solution therein for salt transfer to the cheese bodies;
(3) incorporating dry salt inside of the porous coverings, the procedure being one of preincorporation, and otherwise operated as when dry salt is applied to the outer sides of the porous coverings;
(4) using procedures (2) or procedure (3) and also wetting the porous coverings with water, the water being applied to the coverings before application of the impermeable coverings; or
(5) using procedures (1) and (2) together or procedures (1) and (2) the porous coverings being wet with an externally applied aqueous salt brine, as well as additional salt being provided either on the outside of the coverings or within the coverings.

From the standpoint of convenience and optimum results, procedure (1) as identified above, is preferred. Further, where it is desired to minimize moisture loss and/or add moisture to the cheese, it will usually be less desirable to utilize procedures (2) or (3). Further, the transfer rate can be expected to be slower because of the initial extraction of water. However, it should be understood that the extraction of water from the cheese body to solubilize the dry salt, within or on the outside of the porous coverings, does not necessarily result in a corresponding final moisture loss to the cheese bodies. After most of the salt has diffused into the cheese bodies, a reabsorption of the extracted water can occur, which will tend to reduce the moisture loss. Further, with unusually high moisture cheese it may be desirable to remove some water to control final moisture below 41% for Swiss cheese.

In preferred embodiments of the present invention, where the porous coverings contain externally applied water as well as salt, substantially less moisture loss can be obtained than with the conventional brine tank soaking procedure. For example, the final water content of the cheese bodies after transfer of the salt thereto will usually be equal to or greater than the original water contained in the cheese bodies, or at least not reduced by less than 1% of the original weight of the cheese body; that is, the cheese body on completion of the holding will contain at least 99% or more of the water originally present therein. In preferred embodiments, the holding is continued until the cheese bodies contain the same or a greater amount of water than that originally present.

As the next step in the method, impermeable close-fitting coverings are applied to completely enclose the cheese bodies with the porous coverings thereon. The procedure to be followed here is substantially the same as in the manufacture of rindless Swiss cheese, and any of the impermeable covering materials, such as impermeable wrappers or coatings, can be used, which have been found acceptable for the manufacture of rindless Swiss cheese. Such impermeable coverings, are described in U.S. Pats. 2,494,636 and 2,864,704. The general character of such coverings is specified in "U.S. Standards for Grades of Swiss Cheese, Emmentaler Cheese," U.S.D.A,. published Federal Register, July 12, 1966 (31 F. R. 9443). Where the porous absorbent coverings are designed to be removable and reuseable, it will be desirable to employ impermeable coverings in the form of plastic films, pouches, or wrappers, which can also be readily applied and removed. Since the general character of such impermeable coverings is well known in the cheese art, it is not believed to be necessary to describe them further herein.

The final step in the process is carried out while the cheese bodies are held under suitable storage temperatures, such as the temperatures used for curing or aging of cheese. With reference to rindless Swiss cheese, the overall temperature range from the precooler, through the warm room, to the finish cooler, is from about 36 to 78° F. At all these temperatures, absorption of the salt by osmotic diffusion can proceed.

In general, the cheese bodies should be held with the impermeable and porous coverings thereon while the salt is being transferred from the porous coverings into the cheese bodies. For example, where the porous coverings contain from 0.4 to 4% by weight salt based on the weight of the body, the holding can be continued until the cheese bodies contain from 0.3 to 3.5% salt by weight, or corresponding levels, depending upon starting concentrations in the porous coverings, as described above. Since the distribution of salt in the cheese bodies will vary from higher concentrations adjacent the surfaces to lesser concentrations toward the center, the salt determinations are usually made on a sample slice across the entire body.

In most embodiments, cheese bodies will be held for at least ten days. For manufacturing rindless Swiss cheese, holding periods of thirty to ninety days can be carried out while the porous and impermeable coverings remain on the cheese bodies. In variations of the curing procedure, such as where the precooling is omitted, or where the impermeable wrapper is removed after the warm room holding, and before the finish cooler, the required salt transfer can occur during the warm room holding, which will usually range from two to seven weeks.

SPECIFIC EMBODIMENTS

Referring to FIG. 1 of the drawings, there is shown a rectilinear, six-sided cheese block 10, which is intended to illustrate a block of cooked and drained Swiss curd having a weight of about 22 pounds and dimensions of 14 x 11 x 4 inches. The top and bottom surfaces 10a, 10b thereby provide more total surface area than either of the other two pairs of opposed side surfaces. Porous coverings 11, 12, in the form of ¼ inch thick cellulose sponge pads are applied respectively to top surface 10a and bottom surface 10b, as shown. With this arrangement, good salt transfer can be obtained, although the side surfaces of the cheese bodies are not covered with the sponge pads.

To incorporate approximately 0.3 pound of salt in a cheese block formed and dimensioned as described with respect to FIG. 1, 225 ml. of saturated (26%) brine solution is applied to each of the sponge pads 10a and 10b. This corresponds with a salt concentration in the cheese body of approximately 1.5% if all the salt was transferred. One practical final salt concentration is about 0.9 to 1.2%. Following the application of the brine solution to the pads, the cheese is wrapped with an impermeable covering 13, such as Cryovac W5–201 film, 60 gauge, or other comparable impermeable wrapper for manufacturing rindless Swiss cheese. The wrapped cheese is then held and cured in accordance with standard procedures.

Figure 2:
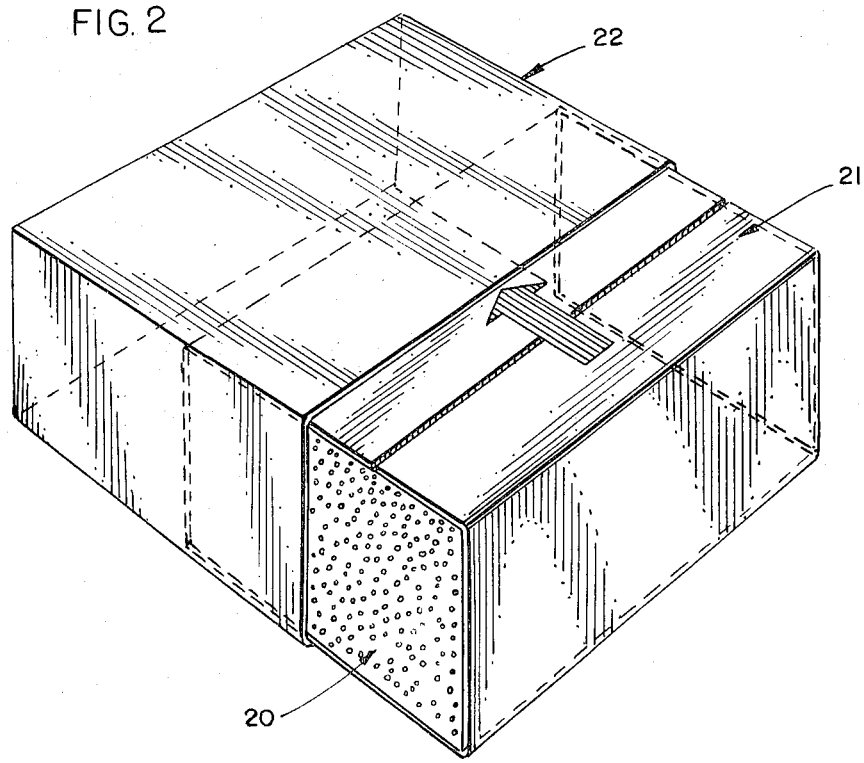
FIG. 2 is a perspective view illustrating another way in which a cheese block can be prepared for practicing the method of this invention, the cheese body being shown wraped with a fibrous blanket for containing the salt brine, and being slipped into a pouch, which will comprise the outer impermeable wrapper.

FIG. 2 illustrates a variation of the method, which is also usable with rectilinear, six-sided cheese bodies, but is particularly applicable for larger size cheese bodies, where it is desired to transfer salt from at least four sides of the bodies. In this embodiment the cheese body 20 is wrapped in a heavy woven cloth blanket 21, which covers the front and rear sides as well as the top and bottom sides of the cheese body, only the relatively small surface ends being left exposed. The cloth can be a closely woven cotton material having a thickness of ⅛ to ¼ inch, and being applied in either a single or double layer, as desired. In the illustration shown in FIG. 2, only a single layer is employed. After the application of the blanket wrap, the amount of brine solution containing the total amount of salt to be supplied to the cheese body can be divided into several aliquots to facilitate equal application to all surfaces of blanket 21, or the total amount applied as one aliquot, but as uniformly as practical. The wrapped cheese body can then be slipped into a pouch 22 of food-acceptable impermeable plastic material, the pouch being dimensioned to fit snugly around the cheese body. For this purpose, it is advantageous to have the ends of the cheese body uncovered so that the pouch can slip over these surfaces without disturbing the blanket 21. After the cheese body is fully inserted a portion of the pouch extending beyond the body will be closed and sealed by a suitable procedure, such as folding and tieing, or heat-sealing.

Figure 3:
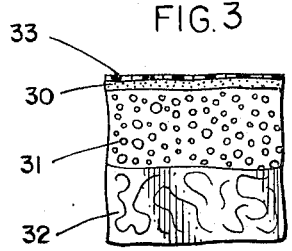
FIG. 3 is a fragmentary enlarged sectional view of a portion of a cheese body prepared for practicing the method of this invention, the illustration particularly showing the use of dry salt applied to the outer surface of the sponge pads and inside of the outer impermeable wrapper.
Figure 4:
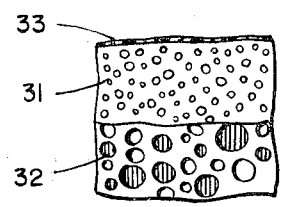
FIG. 4 is an enlarged fragmentary sectional view similar to FIG. 3, illustrating the disappearance of the dry salt after the eyes have formed.

FIGS. 3 and 4 illustrate a further variation of the procedure wherein a layer of dry salt 30 is applied to the outer surface of the porous covering, such as the sponge pad 31, which at its inner side contacts an outer surface of the cheese body 32. The impermeable plastic wrapper is indicated at 33 overlying the dry salt 30. For general use, the use of dry salt is not preferred. In some instances, it may be useful to reduce the total moisture content of the cheese body. For example, the total amount of salt to be incorporated can be added as dry salt, in the manner indicated, and the outer wrapper 33 applied without wetting the pads 31 with water or brine. This method might also be employed where the porous pads do not have sufficient brine holding capacity so that added saturated brine can contain all of the salt desired to be transferred to the cheese. The balance of the salt then can be applied as dry salt, as indicated in FIG. 3 and as the salt is transferred from the brine within the sponge pad, additional salt will dissolve from the dry salt layer. FIG. 4 illustrates the condition of the outer portion of the cheese body after the cheese has been cured for sixty to ninety days, substantially all of the salt having dissolved, and only the outer wrapper 33 and sponge 31 being observable.

Figure 5:
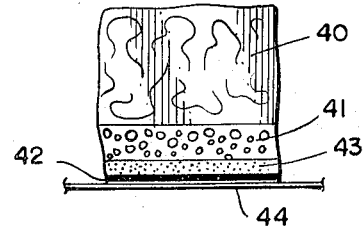
FIG. 5 is another enlarged fragmentary sectional view illustrating a technique for using dry salt beneath the lower sponge pad of a cheese body, a retainer sheet for holding the dry salt being positioned below the sponge pad and above the impermeable covering.

FIG. 5 illustrates a further specific embodiment, which may be desirable where part or all of the salt is being applied as dry salt, and where it is desired to apply the salt through a porous covering on the bottom surface of the cheese block, such as the indicated block 40. As shown, the sponge pad 41 is against the bottom surface of the body. Beneath that is a retainer sheet 42, which may be a sheet of either porous or impermeable material, which serves the function of holding the dry salt 43 against the pad 41 while the cover 44 is applied. Alternatively, the dry salt can be applied directly to an area of the cover 44 onto which is placed the pad 41 and then the cheese block 40. A top sponge pad and salt layer can be applied, as illustrated with respect to FIG. 3, and the impermeable cover 44 can be brought up around the sides and over the top of the body to complete the enclosure.

Where the porous coverings are removable with the residual dilute brine solution therein, a by-product can be obtained by recovering this solution, and processing it to prepare a food flavor additive. Where the cheese bodies being processed are Swiss cheese, as preferred, the by-product will be a Swiss cheese flavored solution. With the embodiments of FIGS. 1 or 2, the sponge pads 10a, 10b or the fabric wrap 21 are removed at the conclusion of the curing of the Swiss cheese with dilute Swiss cheese flavored brine solution therein. By pressing and squeezing the sponge pads or fabric cloth, the brine solution will be expelled. It can be used as is, or it can be further processed by vacuum evaporation to concentrate the cheese flavor. If desired, any excess sodium chloride can be removed by ion exchange treatment.

In this application, the terms "salt" and "salt brine" are used to refer to sodium chloride and aqueous solutions of sodium chloride, as is well understood in the cheese manufacturing art. However, where for special reasons, such as the preparation of dietetic cheese products, it is desirable to incorporate other salts in the cheese than sodium chloride, the method of the invention can also be employed.

This invention is further illustrated by the following examples:

EXAMPLE I

Swiss cheese was prepared as follows:

Heat-treated milk containing about 2.8% milk fat was cooled to 90° F. and inoculated with cultures of mesophilic lactic acid-forming streptococci, *Streptococcus thermophilus, Lactobacillus bulgaricus,* and propionibacteria. Following ripening and coagulation with rennet, the coagulum was cut to ¼-inch cubes and was successfully stirred, cooked, and stirred. The curd was then gathered and pressed under whey for a short time. After a single cohesive curd mass was formed, all free whey was drained from the vat and pressing continued for approximately 18 hours. The rectangular blocks of cheese were salted by applying two cellulose sponges to the two largest surfaces of the cheese. The sponges were ¼-inch thick and had the same length and width as the blocks of cheese. Sufficient saturated brine solution was added to the sponges to give a salt content equal to 1.5% of the weight of the cheese. For a comparison, some cheese from the same vat was salted in the conventional manner by holding it for 3 days in 45° F. saturated brine. The cheese was then wrapped in flexible, impermeable film, sealed, and held for 10 days at 45° F. The cheese was then removed to a curing room maintained at about 72° F. and was held there for 34 days until characteristic eyes and flavor developed. Curing was continued in a 40° F. cold room until the cheese was approximately 90 days old. The wrapper and sponges were removed and the cheese salted with sponges was found to have 1.28% salt compared with 0.89% salt for the conventionally salted cheese. The cheese salted with sponges had a moisture content 2.0% higher than the conventionally brined cheese which had lost about 2.2% of its original weight to the brine tank. The flavor and eye development of the cheese was satisfactory and there was no obvious difference in the cheese salted using sponges and the controls salted in the brine tank.

In some instances the sponges were removed after the 34 day incubation at 72° F. and the cheese was rewrapped for the remainder of its curing. This variation yielded cheese with essentially the same salt and moisture content as the cheese left with sponges for 90 days.

EXAMPLE II

Cheese made as in Example I was salted by applying two layers of heavy blotting paper to the two largest surfaces of the cheese. The blotting papers were 0.6 mm. thick and were of the same length and width as the block of cheese. Sufficient saturated brine was added to the blotting papers to give a salt content equivalent to 1.5% of the weight of the cheese. This procedure yielded cheese with 0.90% salt and a moisture content 1.5% higher than cheese salted by the conventional method in a brine tank. The flavor and eye development of the cheese was satisfactory.

EXAMPLE III

Cheese made as in Example I was salted by applying cotton cloths to the two largest surfaces of the cheese. The cloths were folded so that they had the same length and width as the block of cheese. Sufficient saturated brine was added to the cloths to give a salt content equivalent to 1.5% of the weight of the cheese. This procedure yielded cheese with 1.07% salt and a moisture content 3.4% higher than control cheese salted by the conventional method in a brine tank. The flavor and eye development of the cheese was satisfactory.

EXAMPLE IV

Cheese made as in Example I was salted by applying a sheet of filter paper and a pad of spun Pyrex glass to the two largest surfaces of the cheese. The filter paper and glass fiber pad were of the same length and width as the block of cheese. The filter paper was placed next to the cheese so that the glass fibers did not come into direct contact with the cheese. Sufficient saturated brine was added to the pads to give a salt content equivalent to 1.5% of the weight of the cheese. This procedure yielded cheese with 0.82% salt and 3.2% more moisture than control cheese salted by the conventional method in a brine tank. The flavor and eye development of the cheese was satisfactory.

EXAMPLE V

Cheese made as in Example I was salted by applying saturated brine containing 5% agar to the two largest surfaces of the cheese. The brine and agar were steamed just before application to the cheese to disperse the agar, and the warm solution applied to the cool cheese surface so that it gelled quickly. Sufficient brine was used to give a salt content equivalent to 1.5% of the weight of the cheese. When the cheese was 90 days old, the agar was scraped off. This procedure yielded cheese with 1.16% salt and a moisture content 1.5% higher than cheese salted in the conventional way in brine tanks. The flavor and eye development of the cheese was satisfactory. The exterior surfaces of the cheese that had been in contact with the agar layer were softer than normal.

EXAMPLE VI

Cheese made as in Example I was salted using sponges as in Example I except that instead of adding brine to the sponge, dry salt was spread on the outer surface of the sponge. The salt was placed on the outer surface of the sponge away from the cheese so that the dry salt did not come in direct contact with the cheese. The sponge was moistened slightly to facilitate salt transfer. A weight of salt was selected to equal 1.5% of the weight of the cheese. This procedure yielded cheese with 1.10% salt and a moisture content 1.3% greater than cheese salted the conventional way in a brine tank.

EXAMPLE VII

Cheese was made as in Example I. A sheet of filter paper was applied to the two largest surfaces of the cheese blocks, and dry salt was spread on the filter paper on the side away from the cheese. Sufficient salt was used to equal 1.5% of the weight of the cheese. This procedure yielded cheese that was 0.86% salt, and the flavor and eye development of the cheese was satisfactory. However, the final moisture content was lower (by 0.84%) than cheese salted in the conventional way in a brine tank.

What is claimed is:

1. The method of manufacturing salted cheese in which the drained curd is formed into uncured cheese blocks having absorptive outer surfaces, preparatory to the salting and curing of the cheese blocks, wherein the improvement comprises the combination of the steps of:
    (a) applying porous absorbent coverings to at least two of the oppositely disposed surfaces of each of said uncured cheese blocks, said porous coverings being capable of holding and diffusing a salt brine in osmotic transfer relation with said cheese block surfaces;
    (b) also applying to said uncured cheese blocks impermeable close-fitting coverings completely enclosing said blocks and said porous coverings;
    (c) providing within said porous coverings an aqueous salt brine of a concentration promoting osmotic diffusion of salt from said porous coverings into said uncured cheese blocks, the total amount of the salt thus provided to the porous coverings for each of said blocks being equal to 0.4 to 4.0% of the weight of the block; and
    (d) holding the thus prepared cheese blocks with said impermeable and porous coverings thereon while said salt is transferred from said porous coverings into said cheese blocks, said holding being continued until the cheese blocks contain from 0.2 to 3.5% salt by weight and not less than 99% of the water originally present in said blocks when said porous coverings are applied.

2. The method of claim 1 in which said porous coverings initially contain water added thereto before said impermeable coverings are applied.

3. The method of claim 1 in which said porous coverings initially contain an aqueous salt brine added thereto before said impermeable coverings are applied, said salt brine having a salt concentration of at least 5% by weight.

4. The method of claim 3 in which said porous coverings comprise sponge pads.

5. The method of claim 3 in which said porous coverings are formed of an absorbent paper material.

6. The method of manufacturing salted cheese in which the drained curd is formed into uncured cheese blocks having absorptive outer surfaces, preparatory to the salting and curing of the cheese blocks, wherein the improvement comprises the combination of the steps of:
    (a) applying porous absorbent coverings to at least two of the oppositely disposed outer surfaces of each of said uncured blocks, said porous coverings being capable of holding and diffusing a salt brine in osmotic transfer relation with said cheese block surfaces;
    (b) applying an aqueous salt brine to said porous coverings, said salt brine having a salt concentration promoting osmotic diffusion of salt from said porous coverings into said cheese blocks, the total amount of the salt thus provided to the porous coverings for each of said bodies being equal to 0.5 to 3.5% of the weight of the block;
    (c) also applying to said uncured cheese blocks impermeable close-fitting coverings completely enclosing said blocks and said porous coverings; and
    (d) holding the thus prepared cheese blocks with said impermeable and porous coverings thereon while said salt is being transferred from said porous coverings into said cheese blocks, said holding being continued until said blocks contain from 0.3 to 3.0% salt by weight based on the final weights of said blocks together with not less than 99% of the water originally present in said cheese blocks when said porous coverings are applied.

7. The method of claim 6 in which said porous coverings are removable substantially intact on completion of said holding.

8. The method of manufacturing rindless Swiss cheese in which the cooked, drained Swiss curd is pressed into uncured cheese blocks having absorptive outer surfaces, preparatory to the salting and curing of the cheese blocks, wherein the improvement comprises the combination of the steps of:
  (a) applying porous absorbent coverings to at least two of the oppositely disposed outer surfaces of each of said uncured Swiss cheese blocks, said porous coverings being capable of holding and diffusing a salt brine in osmotic transfer relation with said cheese body surfaces;
  (b) also applying to said uncured Swiss cheese blocks impermeable close-fitting coverings completely enclosing said blocks and said porous coverings;
  (c) providing within said porous coverings an aqueous salt brine of a concentration promoting osmotic diffusion of salt from said porous coverings into said uncured cheese blocks, the total amount of the salt thus provided to the porous coverings for each of said blocks being equal to 0.5 to 2.0% of the weight of the block; and
  (d) holding and curing the thus prepared Swiss cheese blocks with said impermeable and porous coverings thereon for at least 10 days, said salt being transferred from said porous coverings into said cheese blocks during said curing, said holding and curing being continued until said blocks contain at least 0.3% salt by weight together with not less than 99% of the water originally present in said blocks when said porous coverings are applied.

9. The method of claim 8 in which said applied aqueous brine contains substantially all of the salt to be transferred to said cheese bodies, and in which the said two oppositely disposed surfaces of said blocks comprise sides of said blocks having a greater surface area than any other two opposing sides of said blocks.

10. The method of claim 8 in which said porous coverings comprise sponge pads.

11. The method of claim 8 in which said porous coverings are formed of an absorbent paper material.

12. The method of manufacturing rindless Swiss cheese in which the cooked drained Swiss curd is pressed into generally rectilinear 6-sided blocks preparatory to salting and curing thereof, said blocks having weights of the order of 80 to 200 pounds per block and providing absorptive outer surfaces, wherein the improvement comprises the combination of the steps of:
  (a) applying porous absorbent coverings to at least two opposite sides of each of said uncured Swiss cheese blocks, said porous coverings being capable of holding and diffusing a salt brine in osmotic transfer relation with said cheese body surfaces;
  (b) applying an aqueous salt brine to said porous coverings of a concentration promoting osmotic diffusion of salt from said porous coverings into said uncured cheese blocks, the total amount of salt provided to the porous coverings for each of said blocks being equal to 0.5 to 2.0% of the initial weight of the block;
  (c) also applying to said uncured Swiss cheese blocks impermeable close-fitting coverings completely enclosing said blocks and said porous coverings; and
  (d) holding the thus prepared Swiss cheese blocks during curing thereof with said impermeable and porous coverings thereon, said salt being transferred from said porous coverings into said cheese blocks during said holding, and said holding being continued until said blocks contain from 0.3 to 1.5% salt by weight based on the final weights of said bodies together with an amount of water at least equal to the water originally contained in said cheese blocks when said porous coverings are applied.

13. The method of claim 12 in which said porous coverings comprise sponge pads which are applied at least to the sides of said blocks having greater surface areas than any other opposing sides thereof.

14. The method of claim 12 in which said aqueous salt brine when applied to said porous coverings has a substantially saturated salt concentration.

15. The method of claim 12 in which said cheese blocks are held and cured with said impermeable and porous coverings thereon for at least 30 days.

References Cited

UNITED STATES PATENTS

| | | | |
|---|---|---|---|
| 3,046,140 | 7/1962 | Hermann | 99—116 |
| 2,765,233 | 10/1956 | Sarett et al. | 99—178 |
| 1,647,749 | 11/1927 | Reynolds | 99—115 |

DAVID M. NAFF, Primary Examiner

U.S. Cl. X.R.

426—392, 442, 506